US 6,565,103 B2

(12) United States Patent
Wilson

(10) Patent No.: US 6,565,103 B2
(45) Date of Patent: May 20, 2003

(54) SCUBA TANK CADDY, HAVING AN OPTIONAL GEAR DRYING RACK AND AN OPTIONAL PORTABLE SHOWER, AND ITS METHOD OF FABRICATION

(76) Inventor: Scot Morgan Wilson, 395 B Ricketts Rd., Monterey, CA (US) 93940

( * ) Notice: Subject to any disclaimer, the term of this patent is extended or adjusted under 35 U.S.C. 154(b) by 3 days.

(21) Appl. No.: 09/800,630

(22) Filed: Mar. 6, 2001

(65) Prior Publication Data

US 2001/0035620 A1 Nov. 1, 2001

Related U.S. Application Data
(60) Provisional application No. 60/189,520, filed on Mar. 15, 2000.

(51) Int. Cl.$^7$ .................................................. B62B 1/26
(52) U.S. Cl. .................................. 280/47.24; 280/655.1
(58) Field of Search ..................... 280/30, 35, 655.1, 280/43.1, 43.11, 47.18, 47.19, 47.21, 47.24, 47.26, 47.27, 47.28, 79.5

(56) References Cited

U.S. PATENT DOCUMENTS

| | | | | |
|---|---|---|---|---|
| 3,764,072 A | * | 10/1973 | Morehouse et al. | 239/286 |
| 4,674,759 A | * | 6/1987 | Parker | 280/47.26 |
| 4,756,540 A | * | 7/1988 | Crawford | 280/47.21 |
| 4,790,549 A | * | 12/1988 | Armand | 280/47.18 |
| 5,180,179 A | * | 1/1993 | Salvucci | 280/79.5 |
| 5,393,080 A | * | 2/1995 | Ross | 280/47.26 |
| 5,431,422 A | * | 7/1995 | Gamache | 280/47.19 |
| 5,695,121 A | * | 12/1997 | Stillions, Jr. et al. | 239/126 |
| 5,697,624 A | * | 12/1997 | Faraj | 280/47.19 |
| 6,047,983 A | * | 4/2000 | Day, III | 280/47.26 |
| 6,341,789 B1 | * | 1/2002 | Checa et al. | 280/47.28 |

* cited by examiner

Primary Examiner—Frank Vanaman
(74) Attorney, Agent, or Firm—Kenneth R. Wright

(57) ABSTRACT

A scuba tank caddy, having an optional gear drying rack and an optional portable shower, for improving the comfort and convenience of the scuba diver. Additional advantages include, but are not limited to, retractable wheels, telescoping shower head, tank-pressurizing freshwater shower, and corrosion-resistance.

2 Claims, 2 Drawing Sheets

SCUBA TANK CADDY, HAVING AN OPTIONAL GEAR DRYING RACK AND AN OPTIONAL PORTABLE SHOWER, AND ITS METHOD OF FABRICATION

This application claims benefit of Ser. No. 60/189,520 filed Mar. 15, 2000.

TECHNICAL FIELD

The present invention relates to the field of scuba diving equipment. More particularly, the present invention relates to apparati for transporting scuba diving equipment. Even more particularly, the present invention relates to a dive equipment transportation apparatus, such as a scuba tank caddy having optional features (e.g. a gear drying rack and a portable shower), and its method of fabrication.

BACKGROUND OF THE INVENTION

With steady interest in the sport of scuba diving, there is a need for effectively transporting scuba diving equipment. Currently, scuba divers are unduly burdened by carrying heavy dive gear along with very heavy air tanks over their shoulders to a dive site. Related art scuba equipment transportation apparati are large nylon bags which do not provide sufficient convenience to the scuba diver. By merely placing all the dive gear in a large bag, the diver is still encumbered with the excessive weight. Thus, a method of manufacturing a lightweight, durable, and cost-effective apparatus for conveniently transporting dive gear, such as a scuba tank caddy with optional features for improving the scuba diving experience (e.g. a gear drying rack and a portable shower), and an apparatus thereby produced are desirable.

BRIEF SUMMARY OF THE INVENTION

The object of the present invention is to provide a method of fabricating a lightweight, durable, and cost-effective scuba tank caddy, having an optional gear drying rack and an optional portable shower, for improving the comfort and convenience of the scuba diver, and a caddy thereby manufactured. Generally, the scuba tank caddy's method of fabrication comprises the steps of (a) providing a tank-holder, having a floor for supporting at least one tank, a full-span of at least one tank diameter, and a mid-span located at one-half the full-span; (b) providing an axle, having two ends, the axle being rotatably mounted to the tank-holder; (c) providing two wheels, each wheel of the two wheels being rotatably mounted to each of the two ends of the axle; (d) providing a handle assembly, having a handle stem and a handle bar; (e) providing an elongated tank-holder stem oriented normally to the tank-holder floor, having a top, a bottom, a rear-side, and a pull, the elongated tank-holder stem bottom being mounted at the mid-span of the tank-holder and the handle stem being coaxially oriented with and collapsibly mounted to the elongated tank-holder stem top, the pull being perpendicularly mounted on the rear-side of the elongated tank-holder stem top; and (f) a tank-retaining mechanism, the tank-retaining mechanism being fastened to the elongated tank-holder stem near the elongated tank-holder stem top, thereby producing the scuba tank caddy.

Subsequently, at least one tank and dive gear are placed in the caddy for easy transportation and usage. The scuba diver can then roll the caddy containing his/her gear and at least one tank along the ground by merely holding the handle bar or the pull, with the caddy angled toward him/her, while walking to the dive site, however remote. Additional advantages provided by the instant invention include, but are not limited to, retractable wheels, wheel-fairings, telescoping shower assembly, tank-pressurizing freshwater shower, self-retracting shower head, and corrosion-resistant components. Thus, "creature-comforts" and convenience have been provided by the present invention to the diver, in contrast to related art gear bags. Further, the manufacture of the present invention involves the use of corrosion-resistant materials, such as polymeric materials, resulting in a more convenient, more durable, and more cost-effective product than the related art apparati.

Other features of the present invention are disclosed or apparent in the section entitled: "DETAILED DESCRIPTION OF THE INVENTION."

BRIEF DESCRIPTION OF THE DRAWINGS

For a fuller understanding of the present invention, the accompanying drawings are below referenced.

Figure 1:
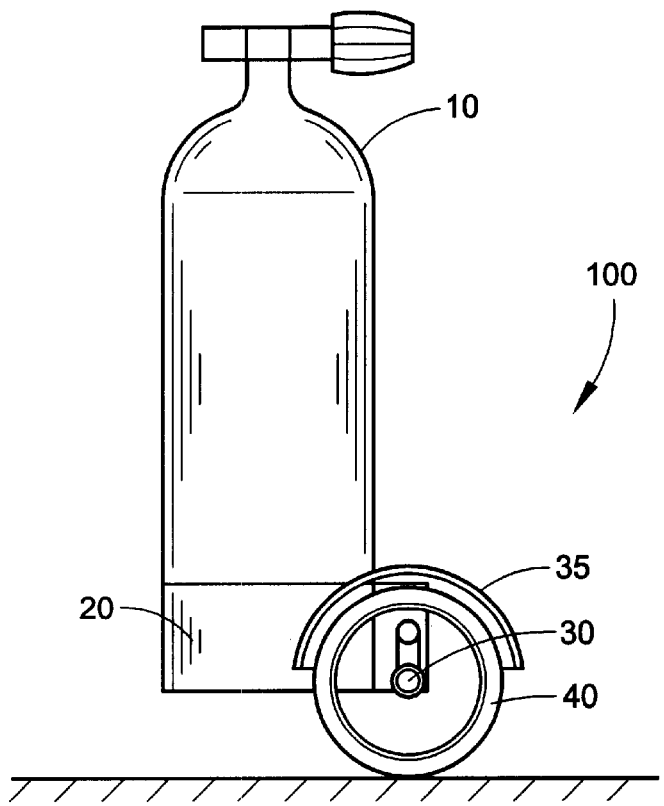
FIG. 1 is a side view of a basic embodiment of a scuba tank caddy with its wheels in an un-retracted position for rolling at least one tank along the ground and having an optional wheel-fairing mounted on each wheel, in accordance with the present invention.

Reference numerals refer to the same or equivalent parts of the present invention throughout the several figures of the drawings.

DETAILED DESCRIPTION OF THE INVENTION

FIG. 1 shows a side view of a present invention basic embodiment of a scuba tank caddy 100 wherein an air tank 10 is placed in a tank-holder 20 having been rotatably mounted to two wheels 40, by either a fastening means or a retracting means 30, in their un-retracted position for rolling at least one tank 10 along the ground. An optional wheel-fairing 35 is mounted to each of the two wheels 40, by either the fastening means or the retracting means 30, for reducing drag and preventing seaweed entanglement during use in water.

Figure 2:
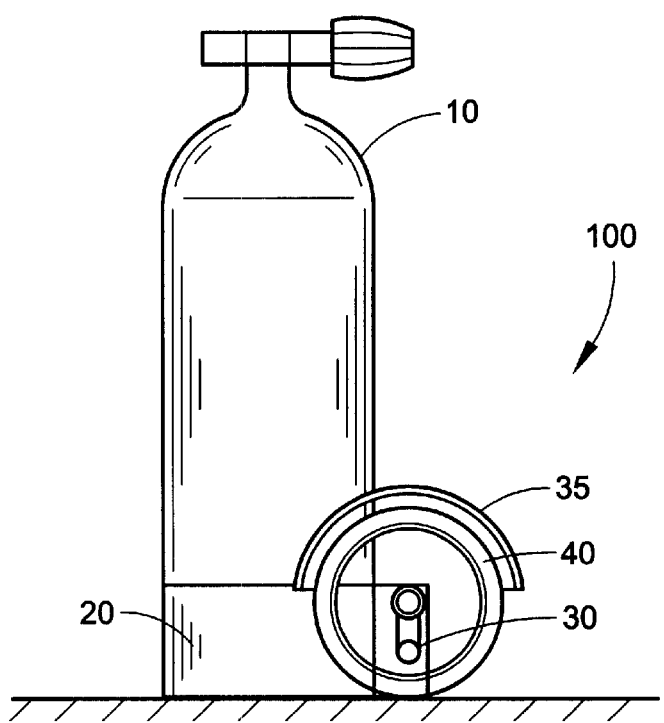
FIG. 2 is a side view of the basic embodiment of a scuba tank caddy with its wheels in a retracted position for use in water or for storage and having an optional wheel-fairing mounted on each wheel, in accordance with the present invention.

FIG. 2 shows a side view of the present invention basic embodiment of a scuba tank caddy 100 wherein an air tank 10 is placed in a tank-holder 20 having been rotatably mounted, to two wheels 40, by either the fastening means or the retracting means 30, in their retracted position for use in water or for storage. The optional wheel-fairing 35 is mounted to each of the two wheels 40, by either the fastening means or the retracting means 30, for reducing drag and preventing seaweed entanglement during use in water.

Figure 3:
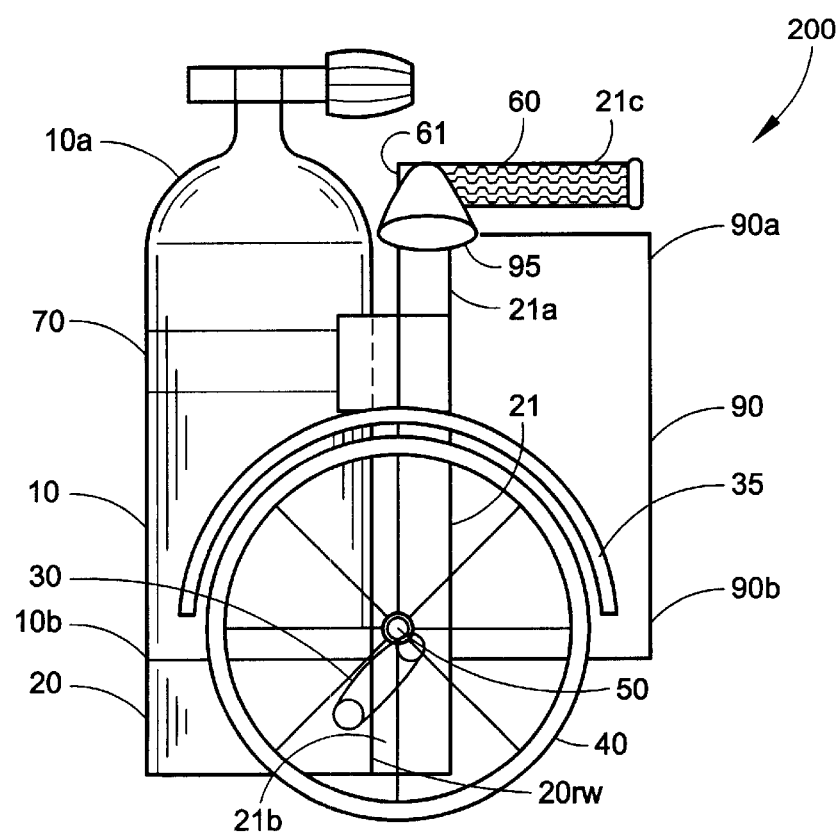
FIG. 3 is a side view of a preferred embodiment of a scuba tank caddy with its handle assembly in a down position, in accordance with the present invention.

FIG. 3 illustrates a side view of a present invention preferred embodiment of a scuba tank caddy 200, comprising: a tank-holder 20 for holding at least one tank 10, each of the at least one tank 10 having a top 10a and a bottom 10b, the tank-holder 20 having a rear wall 20rw and a floor for supporting the tank-bottom 10b, and the tank-holder 20 having a full-span equal to an integer number of at least one tank 10 diameter and a mid-span located at one-half of the tank-holder 20 full-span; an axle 50 having two ends, the axle 50 being rotatably mounted to the tank-holder 20; two wheels 40, which may be made optionally retractable, for facilitating usage of the caddy 200 in water and storage of the caddy 200 when not in use, each wheel of the two wheels 40 being rotatably mounted, by either fastening means or a retracting means 30 such as an over-center cam lever, to each of the two axle ends; a handle assembly 60, in a down position, having a handle stem 61 and a handlebar, the handle stem 61 having a top and a bottom, the handlebar having two ends, the handlebar having a full-span and a mid-span located at one-half of the handlebar full-span, and the handle stem 61 top being mounted at the handle stem top, by a fastening means, to the handlebar at the handlebar mid-span; an elongated tank-holder stem 21 oriented normally to the tank-holder floor, the elongated tank-holder stem 21 having a top 21a, a bottom 21b, a rear-side, and a pull 21c, the tank-holder stem bottom 21b being mounted, by a fastening means, to the tank-holder 20 at the tank-holder mid-span, the pull 21c being perpendicularly mounted on the rear-side of the elongated tank-holder stem top 21a, the handle stem bottom being coaxially oriented with and collapsibly mounted, by a collapsing means, to the elongated tank-holder stem top 21a; and a restraining means 70, such as a locking strap, for restraining the tank-top 10a, the restraining means 70 being mounted, by a fastening means, to the elongated tank-holder stem 21 near the elongated tank-holder stem top 21a. The caddy 200 may further comprise two wheel-fairings 35, for reducing drag and preventing seaweed entanglement during use in water. Each of the two wheel-fairings 35 may be mounted to each of the two wheels 40 by either a fastening means or the retracting means 30.

In addition, the tank-holder stem 21 of the scuba tank caddy 200 may bear a hollow cross-section having a given set of inner dimensions, wherein the handle stem 61 has a cross-section having a given set of outer dimensions, wherein the elongated tank-holder stem 21 hollow cross-section set of inner-dimensions is larger, by a slight tolerance, such as a tolerance in the range of 0.031 inch to 0.0625 inch, than the handle stem 61 cross-section set of outer dimensions, wherein the handle stem 61 is coaxially and collapsibly mounted, by a collapsing means, within the elongated tank-holder stem 21, wherein the collapsing means comprises the handle stem 61 being telescopic from within the elongated tank-holder stem 21, and wherein the handle stem 61 is positioned within the elongated tank-holder stem 21 by a locking means 80 such as a locking pin, a threaded locking ring, a spring-loaded detent, or a locking clip.

Along with this telescopic feature, the scuba tank caddy 200 may further comprise: a reservoir 90 for storing a volume of freshwater, the reservoir 90 having a top 90a and a bottom 90b, the reservoir 90 being either fixedly or detachably mounted to the elongated tank-holder stem 21, the reservoir bottom 90b being either fixedly mounted by a fastening means or detachably mounted by a disconnecting means such as a quick-disconnect, and in fluid communication with the elongated tank-holder stem bottom 21b, and the reservoir top 90a being either fixedly mounted by a fastening means or detachably mounted by a disconnecting means such as a quick disconnect fitting used in combination with a low pressure quick disconnect hose (e.g. Oceanic™ inlet coupling, part #83365, in conjunction with Oceanic™ hose connection, part #816172.26), and in fluid communication with the tank-top 10a; at least one shower head 95 being either fixedly mounted by a fastening means or detachably mounted by a disconnecting means such as a quick-disconnect, a flexible hose, or a self-retracting flexible hose, to at least one of the two handlebar ends; wherein the volume of freshwater in the reservoir 90 is pressurized with a volume of residual air from the at least one tank 10 by opening at least one tank valve, wherein the volume of freshwater is displaced from the reservoir 90 by the volume of residual air through the elongated tank-holder stem 21, subsequently through the handle stem 61, and consequently through at least one handlebar end, being either fixedly mounted by a fastening means or detachably mounted by a disconnecting means such as the quick-disconnect, the flexible hose, or the self-retracting flexible hose, to the at least one shower head 95, wherein the volume of freshwater is forced through the at least one shower head 95, and thereby providing at least one in-situ shower. The reservoir 90 may be either formed from a black material or coated with a black material for self-heating of the contained volume of freshwater by solar energy absorption, and thereby providing a warm in-situ shower.

Figure 4:
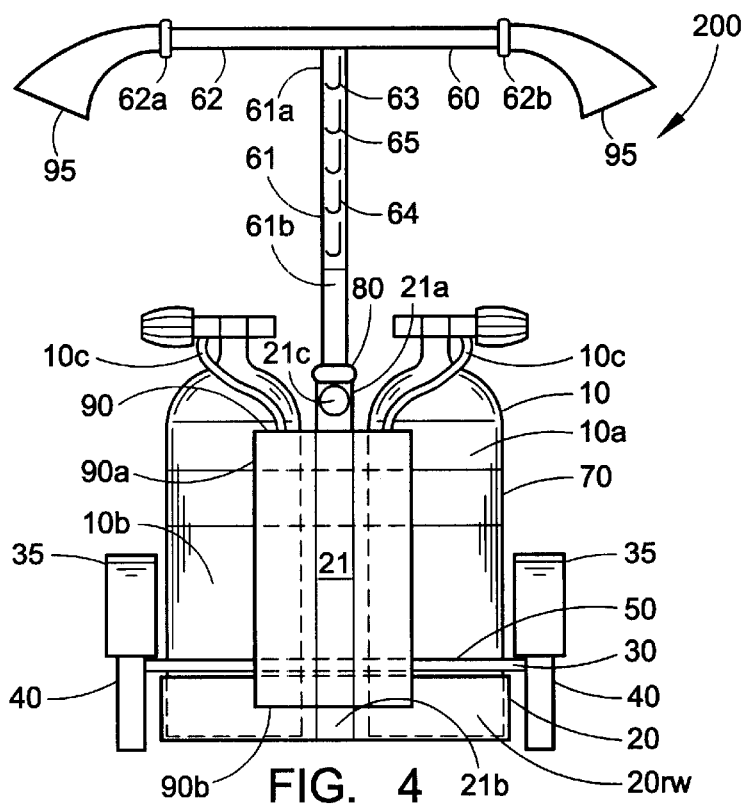
FIG. 4 is a rear view of the preferred embodiment of a scuba tank caddy with its handle assembly in an up position, for rolling at least one tank along the ground, for drying dive gear in situ, and for portably showering a diver in situ, in accordance with the present invention.

Having the foregoing handle assembly 60, the scuba tank caddy 200 may further comprise a retaining means (as shown in FIG. 4 and described, infra) for hanging and facilitating the drying of wet dive gear, wherein the retaining means, in turn, comprises a web strap and a plurality of hooks, the plurality of hooks being mounted, by a fastening means, to the web strap for hanging and facilitating the drying of wet dive gear.

FIG. 4 illustrates a rear view of the present invention preferred embodiment of a scuba tank caddy 200, comprising: a tank-holder 20 for holding at least one tank 10, each of the at least one tank 10 having a top 10a and a bottom 10b, the tank-holder 20 having a rear wall 20rw and a floor for supporting the tank-bottom 10b, and the tank-holder 20 having a full-span equal to an integer number of at least one tank 10 diameter and a mid-span located at one-half of the tank-holder 20 full-span; an axle 50 having two ends, the axle 50 being rotatably mounted to the tank-holder 20; two wheels 40, which may be made optionally retractable, for facilitating usage of the caddy 200 in water and storage of the caddy 200 when not in use, each wheel of the two wheels 40 being rotatably mounted, by either a fastening means or a retracting means 30 such as an over-center cam lever, to each of the two axle ends; a handle assembly 60, in an up position for rolling at least one tank 10 along the ground, having a handle stem 61 and a handlebar 62, the handle stem 61 having a top 61a and a bottom 61b, the handlebar 62 having two ends, 62a, 62b, the handlebar 62 having a full-span and a mid-span located at one-half of the handlebar 62 full-span, and the handle stem 61 being mounted at the handle stem top 61a, by a fastening means, to the handlebar 62 at the handlebar 62 mid-span; an elongated tank-holder stem 21 oriented normally to the tank-holder floor, the elongated tank-holder stem 21 having a top 21a, a bottom 21b, and a pull 21c, the elongated tank-holder stem bottom 21b being mounted, by a fastening means, to the tank-holder 20 at the tank-holder mid-span, the handle stem bottom 61b being coaxially oriented with and collapsibly mounted within the elongated tank-holder stem top 21a; and a restraining means 70, such as a locking strap, for restraining the tank-top 10a, the restraining means 70 being mounted, by a fastening means, to the elongated tank-holder stem 21 near the elongated tank-holder stem top 21a. The caddy 200 is shown further comprising the two optional wheel-fairings 35, for reducing drag and preventing seaweed entanglement during use in water. Each of the two optional wheel-fairings 35 may mounted to each of the two wheels 40 by either the fastening means or the retracting means 30.

In addition, the tank-holder stem 21 of the scuba tank caddy 200 may bear a hollow cross-section having a given set of inner dimensions, wherein the handle stem 61 has a cross-section having a given set of outer dimensions, wherein the elongated tank-holder stem 21 hollow cross-section set of inner-dimensions is larger, by a slight tolerance, such as a tolerance in the range of 0.031 inch to 0.0625 inch, than the handle stem 61 cross-section set of outer dimensions, wherein the handle stem 61 is coaxially and collapsibly mounted, by a collapsing means, within the elongated tank-holder stem 21, wherein the collapsing means comprises the handle stem 61 being telescopic from within the elongated tank-holder stem 21, and wherein the handle stem 61 is positioned within the elongated tank-holder stem 21 by a locking means 80 such as a locking pin, a threaded locking ring, a spring-loaded detent, or a locking clip.

Along with this telescopic feature, the scuba tank caddy 200 may further comprise: a reservoir 90 for storing a volume of freshwater, the reservoir 90 having a top 90a and a bottom 90b, the reservoir 90 being either fixedly or detachably mounted to the elongated tank-holder stem 21, the reservoir bottom 90b being either fixedly mounted by a fastening means or detachably mounted by a disconnecting means such as a quick-disconnect, and in fluid communication with the elongated tank-holder stem bottom 21b, and the reservoir top 90a being either fixedly mounted by a fastening means or detachably mounted by a disconnecting means such as a quick disconnect, and in fluid communication with the tank-top 10a; at least one shower head 95 being either fixedly mounted by a fastening means or detachably mounted by a disconnecting means such as a quick-disconnect, a flexible hose, or a self-retracting flexible hose, to at least one of the two handlebar ends 62a, 62b; wherein the volume of freshwater in the reservoir 90 is pressurized with a volume of residual air from the at least one tank 10 by opening at least one tank valve, wherein the volume of freshwater is displaced from the reservoir 90 by the volume of residual air, through the elongated tank-holder stem 21, subsequently through the handle stem 61, and consequently through at least one handlebar end, 62a, 62b, being either fixedly mounted by a fastening means or detachably mounted by a disconnecting means such as the quick-disconnect, a flexible hose, or a self-retracting flexible hose, to the at least one shower head 95, wherein the volume of freshwater is forced through the at least one shower head 95, and thereby providing at least one in-situ shower. The reservoir 90 may be either formed from a black material or coated with a black material for self-heating of the contained volume of freshwater by solar energy absorption, and thereby providing a warm in-situ shower.

Having the foregoing handle assembly 60, the scuba tank caddy 200 may further comprise a retaining means 63 for hanging and facilitating the drying of wet dive gear, wherein the retaining means, in turn, comprises a web strap 65 and a plurality of hooks 64, the plurality of hooks 64 being mounted, by a fastening means, to the web strap 65 for hanging and facilitating the drying of wet dive gear in situ.

Information as herein shown and described in detail is fully capable of attaining the above-described object of the invention, the presently preferred embodiment of the present invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed:

1. A scuba tank caddy, comprising:
   (a) a tank-holder for holding at least one tank, each of the at least one tank having a top and a bottom,
      the tank-holder having a floor for supporting the at least one tank-bottom, and
      the tank-holder having a full-span of at least one integer number of at least one tank diameter and a mid-span located at one-half of the tank-holder full-span;
   (b) an axle having two ends, the axle being rotatably mounted to the tank-holder;
   (c) two wheels for rolling the caddy on the ground, each wheel of the two wheels being rotatably mounted to each of the two axle ends by a connecting means selected from a group of connecting means consisting of a fastening means and a retracting means;
   (d) a handle assembly having a handle stem and a handlebar,
      the handle stem having a top and a bottom, the handlebar having two ends,
      the handlebar having a full-span and a mid-span located at one-half of the handlebar full-span, and
      the handle stem top being mounted by a fastening means to the handlebar at the handlebar mid-span;
   (e) an elongated tank-holder stem oriented normally to the tank-holder floor,
      the elongated tank-holder stem having a top, a bottom, a rear-side, and a pull,
      the elongated tank-holder stem bottom being mounted by a fastening means to the tank-holder at the tank-holder mid-span,
      the pull being perpendicularly mounted by a fastening means on the rear-side of the elongated tank-holder stem at the elongated tank-holder stem top, and
      the handle stem bottom being coaxially and collapsibly mounted, by a collapsing means, to the elongated tank-holder stem top;
   (f) a restraining means for restraining the tank-top,
      the restraining means being mounted, by a fastening means, to the elongated tank-holder stem near the elongated tank-holder stem top, and thereby producing the scuba tank caddy;
   wherein the elongated tank-holder stem has a hollow cross-section having a set of inner dimensions, wherein the handle stem has a cross-section having a set of outer dimensions, wherein the elongated tank-holder stem hollow cross-section set of inner-dimensions is larger than the handle stem cross-section set of outer dimensions, wherein the collapsing means comprises the handle stem being telescopic from within the elongated tank-holder stem, and wherein the handle stem is positioned within the elongated tank-holder stem by a locking means;

(g) a reservoir for storing and self-heating a volume of freshwater, the reservoir being formed from at least one material selected from a group of materials consisting of a moldable material, a moldable black material, and a coat-able black material, the reservoir having a top and a bottom, the reservoir bottom being mounted by a connecting means and in fluid communication with the elongated tank-holder stem bottom, the reservoir top being mounted by a connecting means and in fluid communication with the tank-top, and wherein the connecting means is selected from a group of connecting means consisting of a fastening means and a disconnecting means; and (h) at least one shower head being mounted by a connecting means to at least one of the two handlebar ends, wherein the connecting means is selected from a group of connecting means consisting of a fastening means and a disconnecting means.

2. The scuba tank caddy, as recited in claim 1, being formed from at least one corrosion-resistant material selected from a group of corrosion materials consisting of a polymer matrix composite, an ABS plastic, a polythylene, a polypropylene, a polybutadiene, a polystyrene, a polyacrylate, a polymethacrylate, a polycrylamide, a polyvinyl acetate, a polyvinyl chloride, a polyvinylidenechloride, a polyvinyl fluoride, a polyvinylidenefluoride, a polyacrylonitrile, a polyurethane, a polyamide, a polycarbonate, a polyisoprene, a stainless steel, a chrome-plated brass, and a titanium.

* * * * *